United States Patent [19]
Guerra

[11] Patent Number: 5,902,202
[45] Date of Patent: May 11, 1999

[54] BELT TENSIONING SYSTEM

[75] Inventor: Lawrence E. Guerra, Roeland Park, Kans.

[73] Assignee: Maytag Corporation, Newton, Iowa

[21] Appl. No.: 08/771,330

[22] Filed: Dec. 16, 1996

[51] Int. Cl.$^6$ ................ F16H 7/14; F16H 7/12; F16H 7/24

[52] U.S. Cl. ............... 474/114; 474/133; 474/150

[58] Field of Search ................ 474/113, 114, 474/133, 119, 125, 126, 144, 148, 150

[56] References Cited

U.S. PATENT DOCUMENTS

| | | | |
|---|---|---|---|
| 3,430,507 | 3/1969 | Hurst et al. ............... | 474/113 |
| 3,744,325 | 7/1973 | Brucken . | |
| 3,866,487 | 2/1975 | Key . | |
| 3,889,496 | 6/1975 | Heyne . | |
| 3,965,768 | 6/1976 | Foster . | |
| 4,018,096 | 4/1977 | Foster . | |
| 4,036,070 | 7/1977 | Knight . | |
| 4,193,315 | 3/1980 | Noe . | |
| 4,571,221 | 2/1986 | Isobe et al. ............... | 474/113 |
| 4,708,695 | 11/1987 | Sugiyama ............... | 474/113 |
| 4,826,469 | 5/1989 | Cooley ............... | 474/113 |
| 4,883,445 | 11/1989 | Gomoll et al. ............... | 474/113 |
| 4,887,992 | 12/1989 | Dixon ............... | 474/114 |
| 4,922,151 | 5/1990 | Lewis . | |
| 4,969,341 | 11/1990 | Burk et al. . | |

FOREIGN PATENT DOCUMENTS 4-188213 7/1992 Japan .

*Primary Examiner*—John A. Jeffery
*Assistant Examiner*—Matthew A. Kaness
*Attorney, Agent, or Firm*—Zarley,McKee,Thomte,Voorhees & Sease

[57] ABSTRACT

A belt tensioning system for an appliance, which has a tub driven by an endless loop drive belt connected to a motor that is movable with respect to a tub housing surrounding the tub, includes a rib extending from the tub housing, a pivotal cam washer having a pivot axis and an eccentrically curved cam profile edge with a series of arcuately spaced contact points thereon for engaging the ribs on the tub housing. The cam washer is pivotally mounted to the motor along the pivot axis and loosenably secured against rotation about the pivot axis and with respect to the motor. Normally, one of the contact points engages the rib so as to establish an offset distance between the rib and the motor, and thereby a tension on the drive belt. When the cam is loosened, the motor can be moved with respect to the tub housing and the cam washer can be pivoted into the rib until the rib rests against a new contact point on the cam profile edge to establish a new offset distance between the motor and rib so that a new tension is applied to the drive belt.

19 Claims, 2 Drawing Sheets

BELT TENSIONING SYSTEM

BACKGROUND OF THE INVENTION

The present invention relates to a belt tensioning system for an appliance having a tub rotatable by a drive means driven by a motor. More particularly, this invention relates to a cam-based belt tensioning system for appliances such as laundry machines, including washers, dryers, and the like.

Various appliances, including but not limited to laundry machines such as washers and dryers, are known to utilize belt and pulley drive systems for rotating the tub. However, belt drive systems can be inefficient and noisy if the proper belt tension is not maintained. Inadequate tension can lead to the belt wearing prematurely, noise, or the belt becoming dislodged completely. Excessive tension on the belt can lead to wearing of the belt, stress on the pulley system or other components, and excessive heat. Therefore, it is desirable to maintain the appropriate tension on the belt in belt drive systems.

Various belt drive systems are known in the art. However, existing belt drive systems have some important disadvantages. Some belt drive systems utilize an adjustable idler mechanism that includes bell cranks pivoted about a common point and interconnected with a threaded member for adjustment. Although such a system is effective, a significant number of parts are required. This relatively complex mechanism also demands a significant amount of space, which may not be available in some appliances. Therefore, there is a need for a simple and effective belt tensioning system in modern appliances.

Therefore, the primary object of the present invention is the provision of an improved belt tensioning system for appliances, including but not limited to laundry appliances such as washers and dryers.

A further object of the present invention is the provision of a belt tensioning system which is simple and effective for setting and maintaining a particular belt tension.

A further object of the present invention is the provision of a cam-based system for adjusting belt tension in a washer or dryer.

A further object of the present invention is the provision of a cam means for increasing or decreasing the tension on a belt in predictable increments.

A further object of the present invention is the provision of a cam means which facilitates a wide range of adjustment.

A further object of the present invention is the provision of a belt tensioning system which has fewer parts than existing belt tensioning systems.

A further object of the present invention is a provision of a belt tensioning system which is economical to manufacture, durable in use, convenient to use and simple in construction.

These and other objects will be apparent from the drawings, as well as from the description and the claims which follow.

SUMMARY OF THE INVENTION

The present invention relates to a belt tensioning system for an appliance having a tub rotatably mounted within a tub housing and driven by a motor that is movable with respect to the tub housing and thereby the tub. An endless loop drive means connects the motor to the tub.

The belt tensioning system comprises a pivotal cam washer. The cam washer has a pivot axis and an eccentrically curved cam profile edge with a series of arcuately spaced contact points thereon for engaging the rib on the housing. The cam washer pivotally mounts to the motor along the pivot axis and is loosenably secured against rotation about its pivot axis and with respect to the motor. Normally, one of the contact points engages the rib so as to establish an offset distance between the rib and the motor and thereby maintains a tension on the drive means.

When the cam washer is loosened, the motor can be moved with respect to the tub housing, and the cam washer can be pivoted into the rib until the rib rests against a new contact point on the cam profile edge, which establishes a new offset distance between the motor and the rib so that a new tension is applied on the drive means.

In one embodiment, the cam profile edge includes a plurality of notches therein. The contact points are disposed in the notches such that the cam washer and the rib constitute a rotatable ratchet and pawl respectively. Eighteen notches can be positioned around the eccentric portion of the cam washer in ten degree increments with indicia provided adjacent the notches to assist in making tension adjustments.

The present invention also provides a method of adjusting tension on a drive belt which extends between a motor and a tub in a laundry machine. The method includes providing a selectively rotatable cam means having a cam profile with a plurality of notches thereon on the motor and a rib on the tub housing adjacent the cam means. Adjustment is provided by moving the motor with respect to the tub housing until a desired belt tension is achieved. The tension is set by rotating the cam means with respect to the motor until the cam profile engages the rib on the tub housing. Securing the cam means to the motor and the motor to the tub housing maintains the desired belt tension. The same fastener can simultaneously secure the motor with respect to the tub housing and secure the cam means against rotation.

The present invention also includes a cam washer comprising a body member having a pivotal connection member defining a pivot axis. The body member has an eccentric peripheral edge defining a cam profile. The cam profile includes a plurality of angularly spaced notches therealong. Again, the notches can be uniformly spaced along the cam profile to facilitate predictable adjustments to the belt tension.

DETAILED DESCRIPTION OF THE PREFERRED EMBODIMENT

Figure 1:
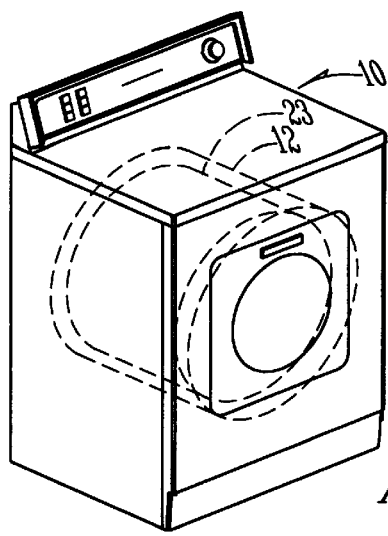
FIG. 1 is a perspective view of an appliance equipped with the belt tensioning system of the present invention.

The present invention is useful in appliances having a tub rotated by motor through a belt or chain mechanism. In FIG. 1, appliance 10 is shown to be a laundry machine, such as a washer. However, those skilled in the art will appreciate that the present invention can be applied to other household, commercial and industrial appliances, including but not limited to dryers and the like.

Figure 2:
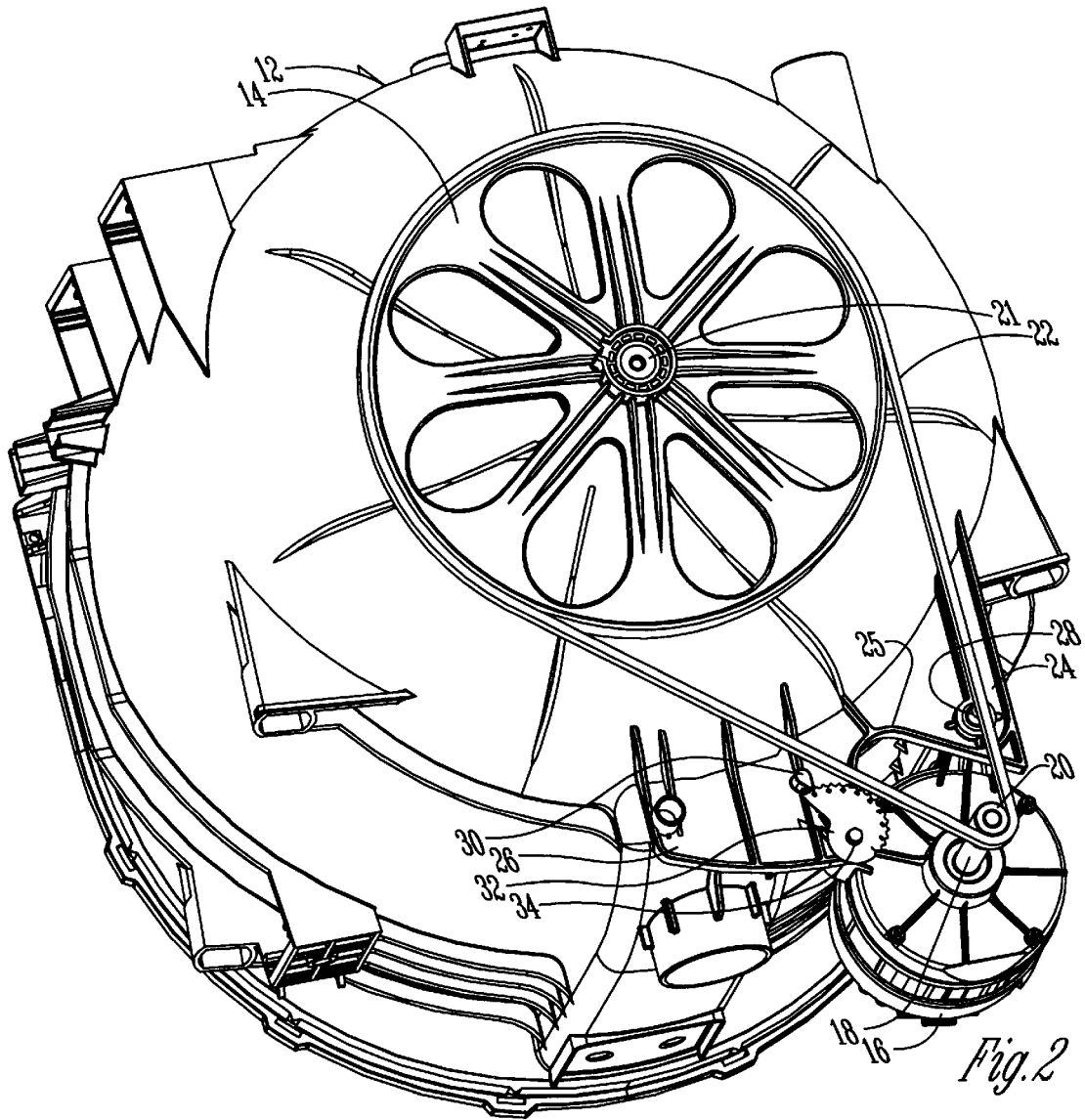
FIG. 2 is a perspective view of the back of the tub housing from FIG. 1 and shows the various components of the belt tensioning system of this invention, including the cam and the rib.

In FIG. 2 the appliance 10 is shown to include a rigid tub housing 12. A pulley 14 is centrally and rotatably mounted on the rear of the tub housing 12. A motor 16, preferably of the electric type, has an output shaft 18 with a free end and a pulley 20 fixed for rotation thereon. The pulley 14 is drivingly connected with a drive shaft 21 which extends upwardly into the inside of the tub housing 12. The output shaft 18 of the motor 16 is generally parallel with the drive shaft 21. A chain, belt 22, or other suitable endless loop drive means extends between the pulley 14 mounted on the tub housing 12 and the pulley 20 on the motor 16. Thus, the belt 22 drivingly connects the motor with the pulley 14 and thereby with the perforated tub 23 through the drive shaft 21.

Ears 24, 26 extend radially outward near the bottom of the tub housing 12. A large V-shaped notch 25 is disposed between the ears 24, 26 to provide additional clearance for the motor shaft 18. The ear 24 provides a pivotal connection 28 for mounting the motor 16 to the tub housing (see also FIG. 3).

The ear 26 has a rib 30 extending downwardly therefrom. The rib 30 has a generally pear-shaped cross-section and is preferably integrally formed with the tub housing 12. For instance, the rib 30 can be molded with the tub housing 12. The apex of the rib 30 engages a cam means 32 which is pivotally mounted to the washer by a fastener 34 that extends through a slot 36 (see FIG. 4) in the ear 26 and then into the motor 16.

Figure 5:
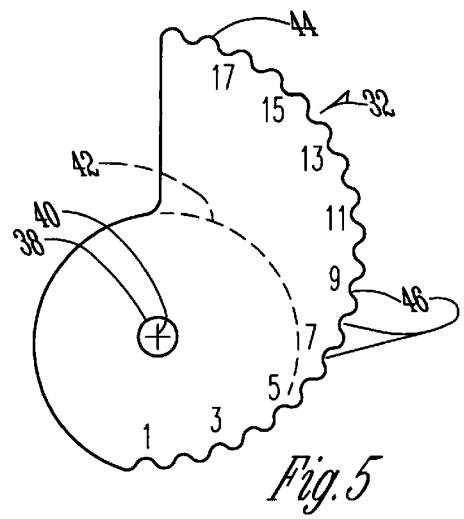
FIG. 5 is a top plan view of the cam of FIG. 2.
Figure 3:
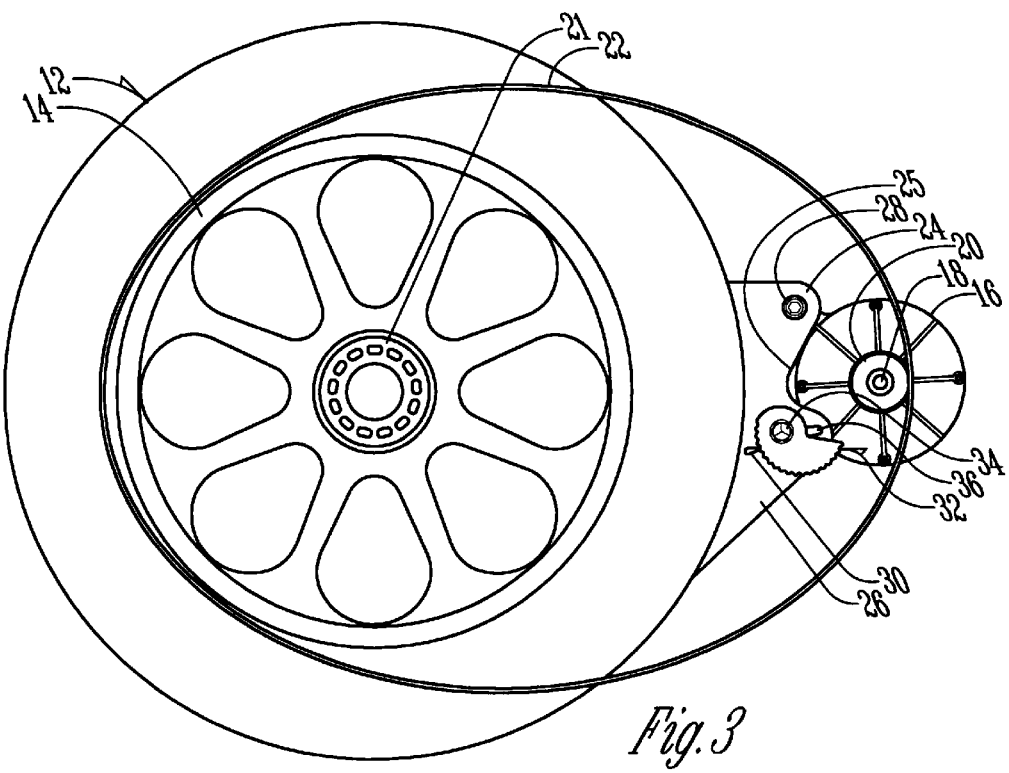
FIG. 3 is a rear plan view of the tub housing and the belt tensioning system of this invention when the belt is initially installed.

Referring to FIG. 5, the cam means 32 is a plate cam and resembles a washer because it has a mounting hole 38 therethrough. The female pivotal connection of mounting hole 38 is preferred, but a male pivotal connection member can also be used without detracting from the present invention. The cam washer 32 has a pivot axis 40 which is defined by the mounting hole 38 and the fastener 34 (FIG. 3). A base circle 42, which has a constant radius with respect to the mounting hole 38, forms one portion of the cam washer 32. The cam washer 32 also includes an eccentric peripheral edge which defines a cam profile 44. The base circle 42 is tangent to at least one point along the cam profile 44. The cam profile 44 includes a plurality of angularly spaced notches 46 thereon and extends through an angle of approximately 180° with respect to the pivotal connection member or hole 38 and the base circle 42.

In the preferred embodiment, eighteen notches 46 are spaced approximately 10 degrees apart along the cam profile 44. Numerical indicia 1,3,5,7,9,11,13,15,17 are provided along the cam profile 44. For instance, the indicia 9 indicates a potential shift of approximately 90° in the position of the cam washer 32.

The cam means 32 is preferably a rigid plate about ⅛ inch thick. Thus, cam means 32 can be cold-stamped from a variety of conventional metals or formed from a hard, durable plastic material. Thus, the cam means is essentially a plate cam having opposite and planar sides with the cam profile being an edge interposed between them. Preferably the planar sides are parallel to each other. The cam means 32 is also referred to in the art as an outside diameter cam.

Figure 4:
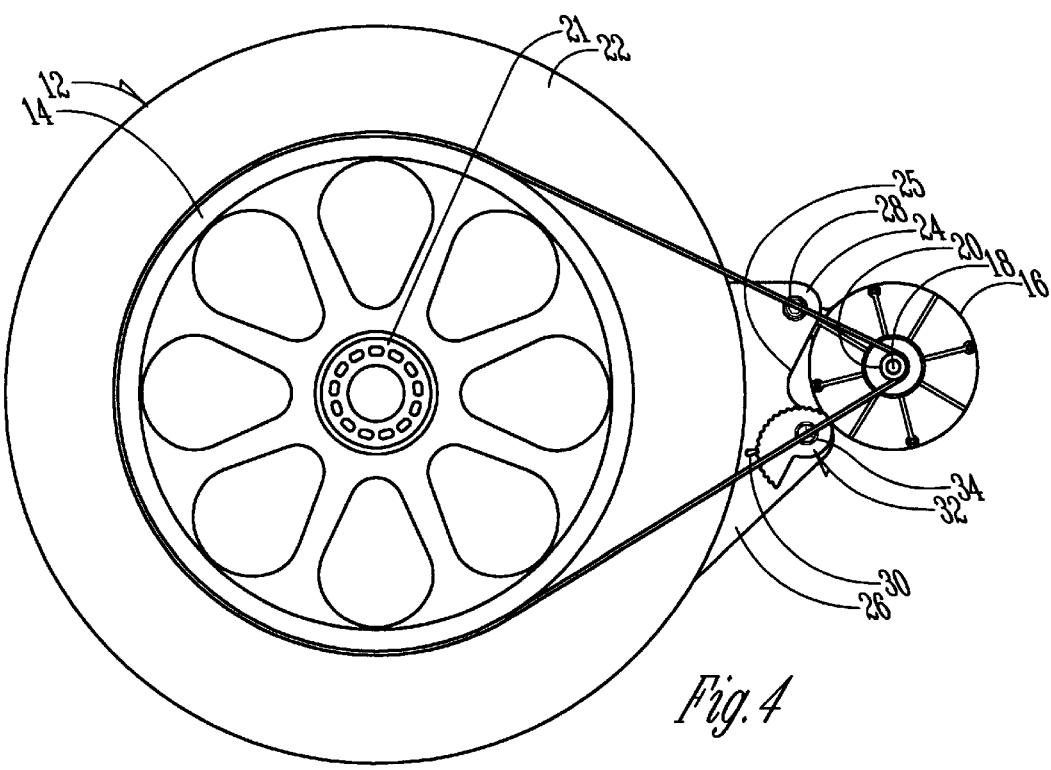
FIG. 4 is a rear plan view of the tub housing and the belt tensioning system of this invention adjusted to apply a desired amount of tension to the belt.

FIGS. 3 and 4 illustrate the use of the belt tensioning system, including the cam means 32. FIG. 3 illustrates that the belt 22 is initially positioned over the pulley 14 and extended around the pulley 20 on the motor 16. The motor 16 may have been previously pivoted inward toward the ear 26 on the tub housing 12. The motor 16 can be pivoted by loosening the fastener 34 on the cam means 32 so as to permit the fastener 34 to slide in the slot 36. The cam means 32 may have been pivoted so that the rib 30 rests in one of the notches 46. Each of the notches 46 includes a contact point for selectively engaging the rib 30.

One pivots the motor 16 outwardly from the ear 26. The cam means 32 is pivoted clockwise to a notch (and the contact point) disposed a larger radial distance away from the pivot axis 40 of the mounting hole 38 (FIG. 5). When the desired tension is achieved in the belt 22, the user tightens the fastener 34 to secure the cam means 32 against further rotation. This secures the motor 16 at the desired offset distance from the tub housing.

To reduce the tension on the belt 22, one loosens the fastener 34 on the cam means 32, moves the motor 16 toward the tub housing 12, pivots the cam means 32 counterclockwise to a notch having a lower indicia number (closer to pivot axis 40), and then retightens the fastener 34 to secure the cam means 32 and the motor 16. To increase the tension on the belt 22, one loosens the fastener 34 on the cam means 32, moves the motor 16 outwardly to a larger offset distance from the tub housing 12, rotates the cam means 32 in a clockwise direction so that the rib 30 contacts a notch 46 having a higher indicia number, and retightening the fastener 34 to secure the cam means 32.

Therefore, the present invention at least achieves its stated objects.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A belt tensioning system for an appliance comprising:
   a tub housing;
   a motor that is movable with respect to the tub housing;
   a tub rotatably mounted within the tub housing and driven by a drive belt connected to the motor;
   a rib extending from the tub housing at a fixed position;
   a pivotal cam washer having a pivot axis and an eccentrically curved cam profile edge with a series of arcuately spaced contact points thereon for engaging the rib, the cam washer being pivotally mounted to the motor along the pivot axis and loosenably secured against rotation about the pivot axis, the washer being normally positioned such that one of the contact points engages the rib so as to set an offset distance between the rib and the pivot axis and thereby establish a tension on the drive belt;
   whereby, when the cam washer is loosened, the motor can move with respect to the tub housing and the cam washer can be pivoted into the rib until the rib rests against a new contact point on the cam profile edge to establish a new offset distance between the pivot axis and the rib so that a new tension is applied to the drive belt.

2. The belt tensioning system of claim 1 wherein the cam profile edge extends a first radial distance from the pivot axis in a first angular position with respect to the pivot axis and extends a second radial distance from the pivot axis in a second angular position with respect to the pivot axis, the first radial distance being smaller than the second radial distance.

3. The belt tensioning system of claim 1 wherein the cam profile edge is defined by rotation of a progressively increasing radius about the pivot axis from a first angular position with respect to a second angular position with respect to the pivot axis.

4. The belt tensioning system of claim 3 wherein the curved cam profile edge extends for approximately 180° around the pivot axis from the first angular position to the second angular position.

5. The belt tensioning system of claim 4 wherein the cam profile edge includes eighteen notches therein between the first angular position and the second angular position, each of the notches being angularly spaced approximately 10° apart.

6. The belt tensioning system of claim 1 wherein the cam profile edge includes a plurality of notches therein and the contact points are disposed in the notches such that the cam washer and the rib constitute a rotatable ratchet and pawl respectively.

7. The belt tensioning system of claim 6 wherein the notches in the cam profile edge extend generally toward the pivot axis and an approximately equal distance inward from the cam profile edge.

8. The belt tensioning system of claim 6 wherein numerical indicia indicative of angular position of the respective notches are provided adjacent the notches in the cam profile edge.

9. The belt tensioning system of claim 1 wherein the cam washer further comprises a hole therethrough for mounting the cam washer to the motor.

10. The belt tensioning system of claim 1 wherein the cam washer further comprises an elongated slot therethrough having a longitudinal axis that intersects the pivot axis.

11. The belt tensioning system of claim 1 wherein the rib is rigidly mounted on the tub housing.

12. The belt tensioning system of claim 1 wherein the rib is integrally formed with the tub housing.

13. The belt tensioning system of claim 1 wherein the cam washer is a plate cam having opposite and planar sides with the cam profile edge interposed therebetween.

14. The belt tensioning system of claim 1 wherein the cam washer is a plate cam having opposite and parallel planar sides with the cam profile edge interposed therebetween.

15. The belt tensioning system of claim 1 wherein the cam washer is an outside diameter cam.

16. The belt tensioning system of claim 1 wherein a pair of spaced apart ears extend from the tub housing, the first ear has the motor mounted thereto at a pivotal connection, the rib extends from the second ear, and the second ear has a slot therein for receiving a fastener therethrough to mount the cam washer to the motor.

17. The belt tensioning system of claim 1 wherein the cam profile edge is an outer peripheral edge.

18. The belt tensioning system of claim 1 wherein the cam washer is loosenably secured to the tub housing.

19. The belt tensioning system of claim 1 wherein the cam washer has a hole therethrough at the pivot axis and a fastener pivotally and loosenably secures the cam washer to the motor along the pivot axis.

* * * * *